Nov. 16, 1965 R. E. MEYER 3,217,459
TOWER STRUCTURE
Filed Sept. 17, 1962
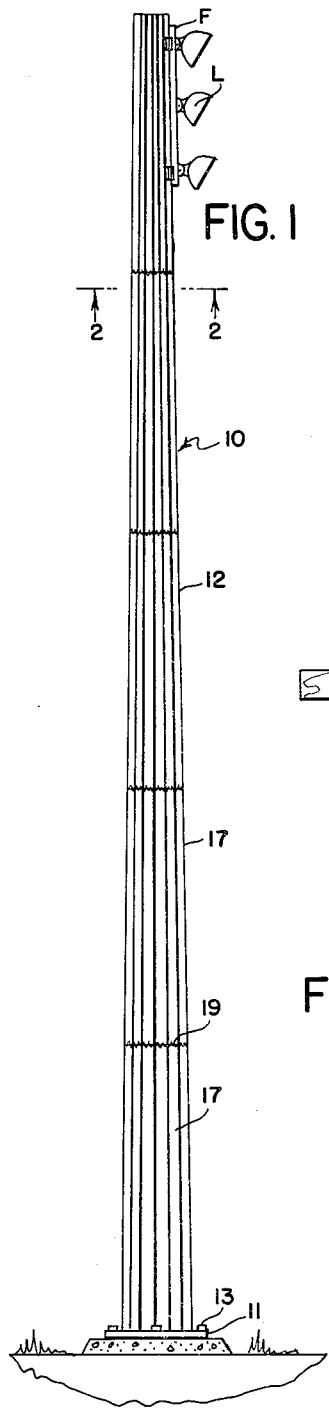
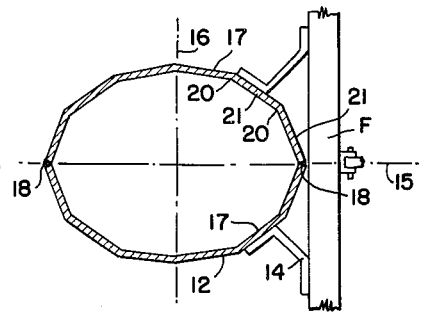
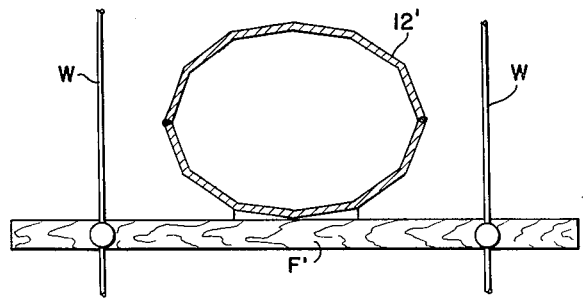
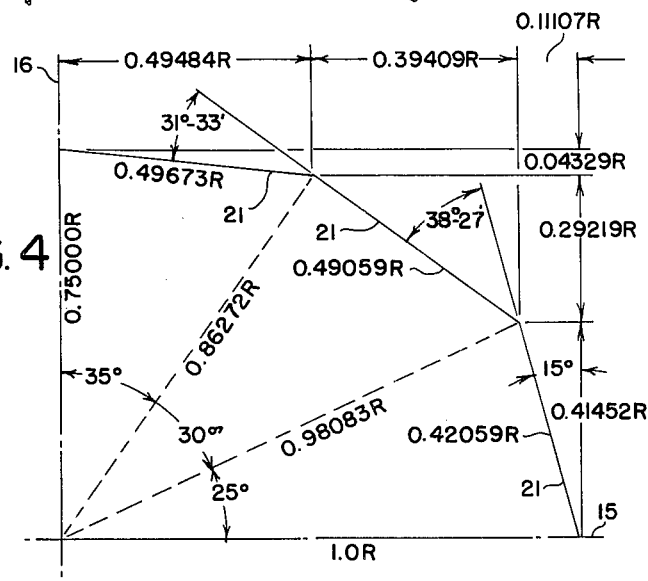
INVENTOR.
ROY E. MEYER
BY
Williamson & Palmatier
ATTORNEYS

# United States Patent Office 3,217,459
Patented Nov. 16, 1965

3,217,459
TOWER STRUCTURE
Roy E. Meyer, Red Wing, Minn.
Filed Sept. 17, 1962, Ser. No. 224,174
1 Claim. (Cl. 52—731)

This invention relates to towers of the type commonly employed for supporting flood lights of the type for illuminating athletic fields and the like.

In the past it has been common practice to employ steel tubular towers, wood poles, and latticed structural steel towers to support such flood lights. Wood poles have many disadvantages such as short useful life, poor appearance, low allowable design stress, increasing costs due to decreasing availability, and extreme scarcity in lengths over seventy feet. Latticed steel towers have poor appearance and require large areas for foundations, which are of substantial importance in athletic field installations where land use and value is critical.

With regard to the use of steel tubular towers of circular cross section for supporting flood lights, the loading characteristics of flood lighting structures is such that the circular section provides an unduly expensive structure and further, the wind pressure on the tower itself unnecessarily contributes to the loading of the tower.

With these comments in mind, it is to the elimination of these and other disadvantages to which the present invention is directed, along with the inclusion therein of other new and novel features.

An object of my invention is to provide a new and improved flood lighting supporting tower construction of simple and inexpensive construction and operation.

Another object of my invention is to provide a novel flood light supporting tower structure which may be readily and easily fabricated at a substantial reduction in materials and labor and which will support the structure thereon adequately against wind loads in various directions.

A still further object of the invention is to provide an improved and novel tower structure which is constructed in sections which may be readily and easily transported to the location of installation and fabricated at the job site.

These and other objects and advantages of my invention will more fully appear from the following description made in connection with the accompanying drawings wherein like reference characters refer to similar parts throughout the several views and in which:

FIG. 1 is an elevation view of a floodlighting tower incorporating the present invention;

FIG. 2 is a detail section view taken approximately at 2—2 in FIG. 1;

FIG. 3 is a detail section view similar to FIG. 2 and showing the present invention applied to a transmission line tower structure; and FIG. 4 is a diagrammatic sketch showing dimensional data of a preferred embodiment of the present invention.

The tower structure is indicated in general by numeral 10 and includes a base 11 of substantial size and firmly emplaced in the ground. The tower structure 10 also includes an upright standard 12 suitably anchored to the base 11 as by studs or anchor bolts 13. The structure also includes a framework F attached to the upper end of the standard 12 as by brackets 14, and the framework F may carry floodlighting fixtures L or other similar apparatus.

The upright standard 12 has a generally tubular shape and is progressively tapered convergently from the lower end thereof toward the upper end thereof. As will be seen in FIG. 2, the standard 12 has a generally oblong or elliptical cross-sectional shape, and the cross-sectional shape is symmetrical about both the major and minor center lines 15 and 16.

The standard 12 is constructed of sheet steel or steel plate material as is evident in FIG. 2 and is formed of a pair of substantially trough-shaped sheet steel sections 17 which are disposed and affixed as by welding 18 in edge-to-edge relation with each other, with other identical sections 17, and further, each of the sections 17 is disposed in end-to-end relation with other adjoining sections 17 as seen in FIG. 1, the end-to-end sections also being welded together as at 19. Each of the trough-shaped sections 17, although of a generally semi-elliptical shape, is bent along a plurality of longitudinally extending, but slightly converging lines 20 so as to form a plurality of planar surface segments 21 tapering convergently in width in an upward direction. When the several sections are welded together as seen in FIGS. 1 and 2, the standard 12 actually has a tubular construction which tapers in an upward direction and which is provided with a plurality of flat and planar surface segments which progressively taper in width in an upward direction. It will be seen that the width of the tower in a direction along the major axis 15 is substantially greater than the breadth of the standard 12 in a direction along the minor axis 16 thereof.

It has been found preferable that the breadth of the standard 12 along the minor axis 16 should be approximately three-fourths (or 75%) of the width along the major axis 15. The cross-sectional shape of the standard 12 is identical in each quadrant of the generally elliptical shape. It will be seen that the standard 12 has three flat plate segments 21 adjoining each other in each quadrant, the particular dimensions and angular relationships, of the several adjoining segments in each quadrant are illustrated by the dimensional data shown in FIG. 4.

It should be noted that because of the generally elliptical shape of the standard 12, the standard is more resistant to deflection due to wind in a direction of the major axis, and because the breadth along the minor axis is considerably less than the width along the major axis 15, the effect of the wind actually applying pressure on the tower in the direction of the major axis is actually considerably less than any previously known sectional configuration.

It will be understood that as illustrated in FIG. 2, the framework shown in FIG. 1 is disposed at the top of the tower and it presents a substantial surface area applying wind load to the standard 12. The frame F is attached adjacent one end of the elliptical cross-section so as to apply the minimum wind load against the tower in such a manner as the tower has maximum resistence to deflection.

As illustrated in FIG. 3, the framework F' is attached to the standard 12' so that the wind load applied against the wires W is at its maximum in a direction along the major axis of the tower cross section.

It will, of course, be understood that various changes may be made in the form, details, arrangement and proportions of the parts without departing from the scope of my invention which consists of the matter shown and described herein and set forth in the appended claim.

What I claim is:

In combination with a load such as athletic field illuminating lights and high tension electric power transmission lines, supported at an elevated position and having wind-resisting surfaces facing predominately in one horizontal direction, a tower having a base to be anchored in the ground and also including, an elongate tubular and upright standard anchored to the base and constructed of a plurality of elongate and substantially rigid sheet steel sections having upper and lower ends and longitudinally extending edges, each of said sections being bent along a plurality of longitudinally extending lines converging toward said upper end providing each of said sections with an integral multi-sided and substantially semi-elliptical trough shape, the trough shape having a width between said edges more than twice exceeding the depth of the trough shape, the longitudinally extending edges of each of said sections adjoining and being welded to corresponding edges of an adjoining section to form a standard with a multi-sided and generally elliptical shape which tapers convergently toward the upper end thereof, the elliptical shape having a major axis and a minor axis, the major axis extending through the welded longitudinal edges of adjoining trough shaped section, the minor axis extending between adjoining sides of each of said trough shaped sections, each of said sides of the elliptical shape being related to the adjoining side in obtuse angular relation to withstand buckling and warping forces created by compressive, tensile, and sheer forces and stresses, the major and minor axes cooperatively defining quadrants in the elliptical shape, each quadrant of the elliptical shape including at least three of said adjoining sides, the ends of each of said sections adjoining and being welded to the ends of adjoining sections with said bends of adjacent sections being aligned with each other, and means securing said load on said standard at an elevated position with said major axis extending in said one horizontal direction.

References Cited by the Examiner

UNITED STATES PATENTS

| | | | |
|---|---|---|---|
| 1,600,066 | 9/1926 | Rastetter | 189—24 |
| 1,878,799 | 9/1932 | Ne Page | 189—23 |
| 1,880,003 | 9/1932 | White et al. | 189—38 X |
| 3,039,414 | 6/1962 | Rosanes | 189—38 X |

FOREIGN PATENTS

| | | |
|---|---|---|
| 2,074 | 6/1874 | Great Britain. |
| 124,239 | 5/1947 | Australia. |

CHARLES E. O'CONNELL, *Primary Examiner.*

RICHARD W. COOKE, JR., *Examiner.*